United States Patent [19]

Ozeki

[11] Patent Number: 4,805,100

[45] Date of Patent: Feb. 14, 1989

[54] LANGUAGE PROCESSING METHOD AND APPARATUS

[75] Inventor: Kazuhiko Ozeki, Yokohama, Japan

[73] Assignee: Nippon Hoso Kyokai, Tokyo, Japan

[21] Appl. No.: 72,158

[22] Filed: Jul. 10, 1987

[30] Foreign Application Priority Data

Jul. 14, 1986 [JP] Japan ............................. 61-163788
Nov. 19, 1986 [JP] Japan ............................. 61-273880

[51] Int. Cl.⁴ ............................................. G06F 15/38
[52] U.S. Cl. ................................... 364/419; 364/900
[58] Field of Search ............... 364/419, 900 MS File, 364/200 MS File

[56] References Cited

PUBLICATIONS

Makino et al., "Automatic Segmentation for Transformation of Kana into Kanji", vol. 20, No. 4; Faculty of Engineering Science, Ozaka University, Jul. 1979.

Makino et al., "An Automatic Transformation System of Non-Segmented Kana Sentences into Kanji-Kana Sentences and its Homonym Analysis", vol. 22, No. 1; Ozaka University, Jan. 1981.

Yoshimura et al., "Morphological Analysis of Non--Marked Off Japanese Sentence by the Least Bunsetsu's Number Method", vol. 24, No. 1; Kyushu University, Jan. 1983.

Oshima et al., "A Disambiguation Method in Kana-to--Kanji Conversion Using Case Frame Grammar", vol. 27, No. 7, Hitachi, Ltd., Jul. 1986.

*Primary Examiner*—Jerry Smith
*Assistant Examiner*—David M. Huntley
*Attorney, Agent, or Firm*—Saidman, Sterne, Kessler & Goldstein

[57] ABSTRACT

When a Japanese or Korean bunsetsu-phrase lattice, that is, a set of linguistic units called bunsetsu-phrases each element of which having various starting and ending positions, and numerical values representing the reliability of each bunsetsu-phrase are given, optimum sequences of bunsetsu-phrases as Japanese or Korean clauses or sentences are selected under a criterion of degree of acceptability of a clause or sentence with considerably small amount of computation; the syntactic structures and the degree of acceptability of the optimum sequences are calculated simultaneously; the gist of the invention residing in that processing proceeds from shorter sequences to longer sequences storing the results for shorter sequences and utilizing later the results in calculating for longer sequences thus systematically avoiding the repeated calculation of partially the same quantity.

2 Claims, 8 Drawing Sheets

LANGUAGE PROCESSING METHOD AND APPARATUS

BACKGROUND OF THE INVENTION

1. Field of the Invention

The present invention relates to a language processing method and apparatus applicable to a speech recognizer for recognizing Japanese or Korean speech which is pronounced either continuously or with a pause between bunsetsu-phrases. The present invention is also applicable to a Japanese word processor of the type in which a Japanese sentence written in Kana (Japanese alphabet) only is converted into a Japanese sentence written orthographically using both Kana and Kanji (Chinese character).

In the above language processing method, when a set of bunsetsu-phrase candidates having various starting and ending positions in the phonetic expression, that is, a bunsetsu-phrase lattice is given, then, a bunsetsu-phrase sequence which is optimum as a Japanese or Korean clause or sentence is selected from the candidate set taking both the reliability of each bunsetsu-phrase and the degree of dependency between two bunsetsu-phrases into consideration. The optimum dependency structure of the selected bunsetsu-phrase sequence as a Japanese or Korean clause or sentence, and the degree of acceptability of the dependency structure thus obtained are also calculated.

In the Japanese language and the Korean language, there are a class of words called "independent word" such as noun, verb, adjective, adverb and so on, and a class of words called "dependent word" such as auxiliary verb and particle. It is noted that a linguistic unit called "bunsetsu-phrase" in this specification is an independent word followed by some (possibly 0) suitable dependent words. An example of bunsetsu-phrase is a noun followed by a particle indicating a case. A suitably conjugated form of a verb followed by an auxiliary verb is another example of bunsetsu-phrase.

2. Description of the Prior Art

A selection of an optimum bunsetsu-phrase sequence from a bunsetsu-phrase lattice is an important problem which appears in various situations of the Japanese or Korean language processing. Let us consider, for instance, a Japanese word processor of the type in which a Japanese sentence written as non-segmented Kana string is converted into a sentence written orthographically using both Kana and Kanji. In order to obtain a good result of conversion, the following two kinds of ambiguity must be resolved.

(A) Ambiguity in segmenting the given Kana string into a sequence of substrings corresponding to bunsetsu-phrases, and (B) ambiguity arising from the homonymity of each substrings obtained as a result of the above segmentation.

An ideal way of resolving the above ambiguity will be selecting an optimum sequence of bunsetsu-phrases, taking both the acceptability of the sequence as a Japanese sentence and the reliability of each bunsetsu-phrase into consideration, from the bunsetsu-phrase lattice decided by all the possible segmentation of the given Kana string and by all the possible bunsetsu-phrases corresponding to each segment. However, only enumeration method has been known to solve the above-mentioned problem, and since the enumeration method is not practicable because of its enormous amount of computation, the following non-optimal methods have been used.

(1) The two-bunsetsu-longest-coincidence method is a well known method of segmenting a Kana string into a sequence of bunsetsu-phrases. (Hiroshi Makino and Makoto Kizawa: "Automatic Segmentation for Transformation of Kana into Kanji", Trans. Inf. Proc. Soc. Japan, Vol. 20, No. 4, pp.337-345 (1979)). According to this method, the total length of two adjacent bunsetsu-phrases is used as a measure of goodness for segmentation, and the boundary between two segments, which permit the longest interpretation as two adjacent bunsetsu-phrases, is adopted as a segmenting point.

(2) Another method is the least BUNSETSU's number method (Kenji Yoshimura, Tooru Hitaka and Sho Yoshida: "Morphological Analysis of Non-Marked-Off Japanese sentence by the least BUNSETSU's number method", Trans. Inf. Proc. Soc. Japan, Vol. 24, No. 1, pp. 40-46 (1983)). In this method, a segmentation which yields a sequence of bunsetsu-phrases having the least number of bunsetsu-phrases is regarded as the best segmentation.

In the above two methods, the strategy to search for a good segmentation is based on a heuristics, and there is no clear reason for the definition of optimality employed. Furthermore, they have no function of resolving the ambiguity coming from the homonymity of each segment, so that the best they can do is to make a list of candidates of bunsetsu-phrases in the order of plausibility, leaving the selection of the appropriate one to the user just like a conventional Japanese word processor which accepts only a segmented Kana string input.

(3) There is also a method in which a given Kana string is first segmented by the above-mentioned two-bunsetsu-longest-coincidence method, and then the sequence of segments is parsed from the standpoint of dependency between bunsetsu phrases in order to find the syntactically best bunsetsu-phrase for each segment. (Hiroshi Makino and Makoto Kizawa: "An Automatic Transformation System of Non-Segmented Kana Sentences into Kanji-Kana Sentences and its Homonym Analysis", Trans. Inf. Proc. Soc. Japan, Vol. 22, No. 1, pp. 59-67 (1981)).

This method is superior to the above-mentioned methods (1) and (2) in that the structure of the Japanese language is utilized for selecting the bunsetsu-phrase sequence from the set of bunsetsu-phrase candidates. However, this method has a problem that because the two-bunsetsu-longest-coincidence method itself is a heuristic method, the optimality of the segmentation is not always ensured. Furthermore, the assumption employed for the sake of simplicity in processing that the dependency relation holds between the nearest bunsetsu-phrases as long as it does not violate the rule of dependency is not always satisfied in the actual situation.

(4) There also exists a method which is, in principle, close to selecting the best bunsetsu-phrase sequence from a bunsetsu-phrase lattice. (Yoshimitsu Oshima, Masahiro Abe, Katsuhiko Yuura and Nobuyuki Takeuchi: "A Disambiguation method in Kana-to-Kanji Conversion Using Case Frame Grammar", Trans. Inf. Proc. Soc. Japan, Vol. 27, No. 7, pp. 679–687 (1986)).

According to this method, however, the selection must be made by the enumeration method, which is computationally impossible. Therefore, the number of possible sequences of bunsetsu-phrases must be limited by using local information prior to global parsing, resulting in a loss of global optimality.

In speech recognition, we also encounter a similar problem of optimum bunsetsu-phrase sequence selection.

One conceivable way of recognizing continuously spoken Japanese or Korean speech will be detecting possible bunsetsu-phrase segments, recognizing them and then listing them as bunsetsu-phrase candidates. Usually, these segments are located at various time positions and overlapped with each other, and there exists ambiguity resulting from homonymity of each segment. Since, in addition to this ambiguity, there is another kind of ambiguity arising from the uncertainty of recognition, the resulting bunsetsu-phrase lattice is more complicated than the one in the afore-mentioned word processor case. In order to obtain the final recognition result, a selection of an optimum bunsetsu-phrase sequence from such a complicated bunsetsu-phrase lattice is necessary. However, only the enumeration method or its modifications have so far been available to solve the problem, therefore, development of a more efficient method has been desired.

SUMMARY OF THE INVENTION

Suppose that a string of phonetic symbols is given. If we cut out substrings of the string which are recognized as bunsetsu-phrases, and list all the homonymous bunsetsu-phrases corresponding to each substring, then we obtain a set of bunsetsu-phrases with various starting and ending positions in the original string of phonetic symbols. Such a set of bunsetsu-phrases is called a bunsetsu-phrase lattice. A bunsetsu-phrase lattice is also obtained as a form of output from a continuous speech recognizer which spots and recognizes bunsetsu-phrase segments in a speech signal. In terms of bunsetsu-phrase lattice, the problem of the present invention may be stated as follows:

"Given a bunsetsu-phrase lattice, select the most appropriate sequence of bunsetsu-phrases taking both the acceptability as a Japanese or Korean clause or sentence and the reliability of each bunsetsu-phrase from all the possible sequences of bunsetsu-phrases satisfying the condition that the ending position of one bunsetsu-phrase is immediately followed by the starting position of the succeeding bunsetsu-phrase."

In order to describe the difficulty in solving the above problem and objects of the present invention, we begin with a rigorous mathematical formulation of the problem.

Here, for improving the readability of a long mathematical expression including "min", we use $$\min(\text{a condition on } x)[f(x)]$$

instead of the conventional $$\min f(x) \text{ a condition on } x.$$

When there is no fear of confusion, parentheses [and] may be omitted. Similar notation is used for argmin, $\Sigma$, $\cup$ as well, where $$\text{argmin}(\text{a condition on } x)[f(x)]$$

denotes the value of x which minimizes f(x) under the condition in the parentheses, $\Sigma$ denotes sum and $\cup$ denotes union of sets.

A Japanese or Korean clause or sentence consists of the modification relationships in a broad sense between bunsetsu-phrases. For instance,

[S1]

机の (Tsukueno) 上に (ueni) ある (aru) ラジオは (radiowa) 昨日 (kino) 買いました (kaimashita).

(The radio on the desk was bought yesterday.)

In this case, "机の (Tsukueno)" (the desk) modifies "上に (ueni)" (on); "上に (ueni)" modifies "ある (aru)" (exists or placed); "ある (aru)" modifies "ラジオは (radiowa)" (radio); "ラジオは (radiowa)" modifies "買いました (kaimashita)" (bought); and "昨日 (kino)" (yesterday) modifies "買いました (kaimashita)". Thus a Japanese sentence is constructed. Furthermore, in the case of a Korean sentence, in [S2]

책상 위에 있는 라디오는 어제 샀읍니다, for instance, "책상" (the desk) modifies "위에" (on); "위에" modifies "있는" (exists or placed); "있는" modifies "라디오는" (radio); "라디오는" modifies "샀읍니다" (bought); and "어제" (yesterday) modifies "샀읍니다", respectively. In this manner, a Korean sentence is constructed.

When a bunsetsu-phrase x modifies a bunsetsu-phrase y, x is said to depend on y and y is said to receive x. Such a modifier-and-modified-phrase relationship is called "dependency" in this specification.

In order that a sequence of bunsetsu-phrases compose a Japanese or Korean clause or sentence, the following conditions are necessary:

[C1] A bunsetsu-phrase, except for the last one, must depend on one and only one of the succeeding bunsetsu-phrases.

[C2] A dependency between two bunsetsu-phrases does not cross with another dependency between other two bunsetsu-phrases.

The conditions [C1] and [C2] can be expressed by the "dependency structure" to be defined below:

[D1] (1) If x is a bunsetsu-phrase, then $<x>$ is a dependency structure.

(2) If $X_1, X_2, \ldots, X_m$ are dependency structures and if x is a bunsetsu-phrase, then $<X_1 X_2 \ldots X_m x>$ is a dependency structure. When $X_1 = <\ldots x_1>, X_2 = <\ldots x_2>, \ldots, X_m = <\ldots x_m>$, are dependency structures, $<X_1X_2 \ldots X_mx>$ signifies a dependency-structure in which $x_1, x_2, \ldots, x_m$ depend on x.

[D2]

When a sequence of bunsetsu-phrase $x_1x_2 \ldots x_n$ is suitably marked with parentheses so that the sequence becomes a dependency structure, it is called a dependency structure on $x_1x_2 \ldots x_n$.

The set of all the dependency structures on $x_1x_2 \ldots x_n$ is denoted by $K(x_1x_2 \ldots x_n)$.

Note that a bunsetsu-phrase sequence can have many dependency structures on it. For instance, $<<$Tsukueno$><$ueni$><$aru$><$radiowa$><$kino$>$kaimashita$>$ $<<<$Tsukueno$>$ueni$<>>$aru$<$radiowa$><$kino$>$kaimashita$>$ $<<<<<$Tsukueno$>$ueni$>$aru$>$radiowa$>$kino$>$kaimashita$>$ $<<<<<$Tsukueno$>$ueni$>$aru$>$radiowa$><$kino$>$kaimashita$>$are some of the dependency structures on Tsukueno ueni aru radiowa kino kaimashita. It does not necessarily follow, however, that all of the above-mentioned dependency structures represent appropriate Japanese sentences. Therefore, a degree of acceptability of a dependency structure is defined in the following manner.

First, a degree of dependency that a bunsetsu-phrase x depends on a busetsu-phrase y is supposed to be expressed by the following function taking a non-negative value:

$PEN(x,y)$.

In the conventional Japanese grammer, it has been considered that a bunsetsu-phrase x can or cannot depend on a bunsetsu-phrase y; that is, PEN (x,y) can taken only the value 0 or 1, but in the present invention, it is permitted that PEN(x,y) can take a continuous value. Furthermore, it is defined that the closer the value of PEN(x,y) to 0, the higher the degree of dependency. It is a very important problem how to determine the function PEN, but since this problem does not constitute the present invention, it will not be described in this specification.

A degree of acceptability P(X) of a dependency structure X is recursively defined as follows by utilizing PEN:

[D3]

(1) If $X=<x>$ (where x is a bunsetsu-phrase), then
$P(X)=0$, and (2) If $X=<X_1X_2\ldots X_mx>, X_1=<\ldots x_1>, X_2=<\ldots x_2>, \ldots, X_m=<\ldots x_m>$, then $$P(X)=P(X_1)+P(X_2)+\ldots+P(X_m)+PEN(x_1,x)+PEN(x_2,x)+\ldots+PEN(x_m,x)$$

The value of P(X) thus defined is the sum of the values of PEN for all of the dependencies in X.

When X and Y are dependency structures such that $Y=<Y_1Y_2\ldots Y_my>$, (where $Y_1, \ldots, Y_m$ represent dependency structures and y represents a bunsetsu-phrase), a dependency structure obtained by inserting X between the left parenthesis and the top dependency structure of Y $<XY_1Y_2\ldots Y_my>$ is denoted by $X \oplus Y$. Then, the following two propositions hold.

[E1]

For dependency structures $X=<\ldots x>$ and $Y=<\ldots y>$, $$P(X \oplus Y)=P(X)+P(Y)+PEN(x,y).$$

[E2]

For an arbitrary bunsetsu-phrase sequence $x_1x_2 \ldots x_n$,
(1) when n=1

$K(x_1)=<x_1>,$ and when $n > 1, K(x_1 x_2 \ldots x_n) =$ (2)

$$\cup (1 \leq k \leq n-1)\{X \oplus Y | X \in K(x_1x_2 \ldots x_k),$$

$$Y \in K(x_{k+1}x_{k+2} \ldots x_n)\}$$

[D4]

For sets of bunsetsu-phrases $A_1, A_2, \ldots, A_m$, we define $KB(A_1, A_2, \ldots, A_m) = \{X | X \in K(x_1x_2 \ldots x_m), x_1 \in A_1, x_2 \in A_2, \ldots, x_m \in A_m\}$ $KB(A_1, A_2, \ldots, A_m)$ represents all the dependency structures on all the bunsetsu-phrase sequences composed by selecting a bunsetsu-phrase from each of $A_1, A_2, \ldots, A_m$, and concatenating them.

[D5]

(1) The m-segmentation of an integer number sequence i, i+1, \ldots, j is an integer set $(s_0, s_1, s_2, \ldots, s_m)$ which satisfy $i-1=s_0<s_1<s_2<\ldots<s_m=j$ (2) The set of all the m-segmentations of an integer sequence i, i+1, \ldots, j is denoted by $D_m(i,j)=\{(s_0,s_1,s_2,\ldots,s_m)|i-1=s_0<s_1<s_2<\ldots<s_m=j\}$ (3) The set D(i,j) of the segmentations of an integer sequence, i, i+1, \ldots, j is defined as follows:

$D(i,j)=\cup(1\leq m\leq j-i+1)[D_m(i,j)]$

Now, the following situation will be considered.

[J1] The positions of phonetic symbols are represented by natural numbers 1 through N. A set of bunsetsu-phrases B(i, j) is given for each i, j($1 \leq i \leq j \leq N$), in which each bunsetsu-phrase has the starting position i and the ending position j. Furthermore, a non-negative real number S(x) is attached to each bunsetsu-phrase x.

Bunsetsu-phrases $x \epsilon B(i,j)$ and $y \epsilon B(i',j')$ ($i \neq i'$ or $j \neq j'$) are treated as different objects even if they coincide as a bunsetsu-phrase.

The set of said B(i,j)($1 \leq i \leq j \leq N$) is called a bunsetsu-phrase lattice. Consider the case of a Japanese word processor in which a non-segmented Japanese sentence written in Kana is converted into a Japanese sentence written in Kana and Kanji. When a Kana string $a_1, a_2, \ldots a_N$ is given, B(i,j) represents the set of all the bunsetsu-phrases having the substring $a_i a_{i+1} \ldots a_j$ as a Kana expression. The value of S(x) is determined by such information as the word frequency. A smaller value of S(x) represents a higher degree of reliability of x. In the case of continuous speech recognition, B(i,j) represents the set of bunsetsu-phrases output as candidates of recognition results for the segment having the starting and ending positions i and j, respectively. In this case, S(x) represents the degree of reliability of the recognition result x determined by the speech recognizer. Most speech recognizers are so constructed as to output such a value together with the recognition result. In either cases, there exists a possibility that there is no bunsetsu-phrase having the starting and ending positions i and j, respectively, so that B(i,j) may become an empty set. In the latter case, in order to avoid an exceptional treatment, when B(i,j) is an empty set, a dummy bunsetsu-phrase is added to B(i,j) and the value of S for the dummy bunsetsu-phrase is defined as infinity. Furthermore, when at least one of x and y is a dummy bunsetsu-phrase, the value of PEN(x,y) is also defined as infinity.

Moreover, S is extended so that it may be applied to a dependency structure. That is, when $X \epsilon K(x_i x_{i+1} \ldots x_j)$, S(X) is defined as follows:

$$S(X) = \Sigma(i \leq m \leq j)[S(x_m)]$$

Under these conditions, the problem of the present invention may be explained as follows:

When a segmentation of the phonetic symbol positions 1, 2, ..., N $$(s_0, s_1, s_2, \ldots, s_m) \epsilon D(1,N)$$

is selected, a sequence of sets of bunsetsu-phrases $$B(s_0+1, s_1), B(s_1+1, s_2), \ldots B(s_{m-1}+1, s_m),$$

is determined corresponding to said selected segmentation. Furthermore, if a bunsetsu-phrase $x_k$ is selected from each set of bunsetsu-phrases $B(S_{k-1}+1, s_k)$, the set of dependency structures $$K(x_1 x_2 \ldots x_m)$$

is determined.

Furthermore, when a dependency structure X is selected from $K(x_1 x_2 \ldots x_m)$, the sum of the degree of acceptability and the degree of reliability is determined as follows:

$$P(X) + S(X)$$

Therefore, it is necessary to select the segmentation, the bunsetsu-phrase sequence and the dependency structure which minimize the value of P(X)+S(X) from above-mentioned all the possible segmentations, bunsetsu-phrase sequences and dependency structures. That is, the problem is to obtain the following minimum value and the values of variables which attain the minimization:

$$\min((s_0,s_1,s_2, \ldots, s_m) \epsilon D(1,N))[\min(x_1 \epsilon B(s_0 + 1, s_1),$$
$$x_2 \epsilon B(s_1 + 1, s_2), \ldots, x_m \epsilon B(s_{m-1} + 1, s_m))$$
$$[\min(X \epsilon K(x_1 x_2 \ldots x_m))[P(X) + S(X)]$$

In order to select the optimum bunsetsu-phrase sequence, it is necessary to take into consideration whether a bunsetsu-phrase sequence is acceptable or not as a Japanese or Korean clause or sentence. As a result, the problem becomes one of obtaining the optimum dependency structure as well as the optimum bunsetsu-phrase sequence as described above. On the other hand, if the optimum dependency structure is obtained, the bunsetsu-phrase sequence composing the structure is determined. So we rewrite the above-mentioned problem into the problem [P1] below in which the dependency structure is the main variable by using the fact:

$$\min((s_0,s_1,s_2, \ldots, s_m) \epsilon D(1,N)) \min(x_1 \epsilon B(s_0 + 1, s_1),$$
$$x_2 \epsilon B(s_1 + 1, s_2), \ldots, x_m \epsilon B(s_{m-1} + 1, s_m))$$
$$\min(X \epsilon K(x_1 x_2 \ldots x_m))[P(X) + S(X)] =$$
$$\min (X \epsilon \cup ((s_0,s_1,s_2, \ldots, s_m) \epsilon D(1,N))[KB(B(s_0 +$$
$$1, s_1), B(s_1 + 1, s_2), \ldots, B(s_{m-1} + 1, s_m))])[P(X) + S(X)]$$

[P1] Find the values of (1) and (2):

$$\min(X \epsilon \cup ((s_0,s_1,s_2, \ldots, s_m) \epsilon D(1,N)) \quad (1)$$
$$[KB(B(s_0 + 1, s_1), B(s_1 + 1, s_2), \ldots, B(s_{m-1} + 1, s_m))])[P(X) + S(X)]$$

and $$\text{argmin}(X \epsilon \cup ((s_0,s_1,s_2, \ldots, s_m) \epsilon D(1,N))) \quad (2)$$
$$[KB(B(s_0 + 1, s_1), B(s_1 + 1, s_2), \ldots, B(s_{m-1} + 1, s_m))])[P(X) + S(X)]$$

Up to the present, the enumeration has been the only available method to solve this problem; we had to calculate P(X)+S(X) for all the dependency structures X in the set $$\cup ((s_0,s_1,s_2, \ldots, s_m) \epsilon D(1,N))$$
$$[KB(B(s_0 + 1, s_1), B(s_1 + 1, s_2), \ldots, B(s_{m-1} + 1, s_m))]$$

in order to find the minimum value and the dependency structure which attains this minimum. When the number of bunsetsu-phrases in each B(i,j) is M, and when the whole length of the string of phonetic symbols is N, the number of elements of the above set is given by $$[G1] \Sigma(1 \leq n \leq N)_{N-1}C_{n-1} \cdot M^j \cdot knum(n)$$

where $_{N-1}C_{n-1}$ is a binomial coefficient, and knum(n) represents the number of dependency structures on a bunsetsu-phrase sequence with length n, which can be calculated as follows:

$$knum(n) = \begin{cases} 1; n = 1 \\ \Sigma(1 \leq k \leq n-1)[knum(k) \cdot knum(n-k)]; n > 1 \end{cases}$$

The values of [G1] for several M and N are shown in TABLE 1.

TABLE 1

| N | M | |
|---|---|---|
|   | 5 | 10 |
| 5  | $5.8 \times 10^4$  | $1.6 \times 10^6$ |
| 10 | $8.0 \times 10^{10}$ | $6.3 \times 10^{13}$ |
| 15 | $1.7 \times 10^{17}$ | $3.9 \times 10^{21}$ |
| 20 | $4.6 \times 10^{23}$ | $2.9 \times 10^{29}$ |

The numbers of elements in the set $\cup ((S_0,S_1, \ldots ,S_m) \in D(1,N))[KB(B(S_0 + 1,S_1), B(S_1 + 1,S_2), \ldots ,B(S_{m-1} + 1,S_m))]$.

Here, the number of elements in B(i,j) is supposed to be the same for all i and j ($1 \leq i \leq j \leq N$), and is represented by M.

It is seen that in the case of the enumeration method, the number of arithmetic operations grows rapidly as N increases, and becomes an extremely large number even for moderate value of N so that it is extremely difficult to apply the enumeration method to the above-mentioned problem in practice.

It is an object of the present invention to overcome the defects encountered in the prior art methods.

More specifically, it is an object of the present invention to provide a language processing method which is remarkably efficient as compared with the prior art methods for the reason that the number of arithmetic operations is of the order of a polynomial with respect to the length of the phonetic symbol string and the number of elements of each bunsetsu-phrase set.

It is another object of the present invention to provide a language processing apparatus which performs the language processing method of the present invention in an efficient manner to overcome the defects of the prior art.

It is apparent that the present invention can be applied not only to the Japanese or Korean language but also to any languages which have grammatical structure based on the dependency relation between words or phrases.

1. Theoretical Foundations of the Invention
1.1. Fundamental Recurrence Equations
1.1.1. The Case of General Bunsetsu-Phrase Lattice Prior to the description of the present invention, recurrence equations which play fundamental rolls in the present invention will be described. First, the following definitions are made:

[D6] For a fixed natural number N, and for i, j, x satisfying $1 \leq i \leq m \leq j \leq N$, $x \in B(m,j)$, $$OPTPS(i,j,m,x) = \min(X \in \cup ((s_0,s_1,s_2, \ldots ,s_p) \in D(i,m-1)) \quad (1)$$

$$[KB(B(s_0 + 1,s_1), B(s_1 + 1,s_2), \ldots ,B(s_{p-1} + 1,s_p), \{x\})])[P(X) + S(X)].$$

When $m = i$, $D(i, m-1)$ is not defined. In this case, the following convention is adopted:

$$\cup ((s_0,s_1,s_2, \ldots ,s_p) \in D(i,m-1))$$

$$[KB(B(s_0 + 1,s_1),B(s_1 + 1,s_2), \ldots ,B(s_{p-1} + 1,s_p),\{x\})] =$$

$$KB(\{x\}) = \{<x>\}$$

$$OPTKS(i,j,m,x) = \text{argmin}(X \in ((s_0,s_1,s_2, \ldots ,s_p) \in D(i,m-1)) \quad (2)$$

$$[KB(B(s_0 + 1,s_1),B(s_1 + 1,s_2), \ldots ,$$

$$B(s_{p-1} + 1,s_p),\{x\})])[P(X) + S(X)]$$

In case of (2), there exist many dependency structures X which minimize $P(X) + S(X)$ in general, so that OPTKS(i,j,m,x) becomes a set.

In the present invention, the following two recurrence equations [T1] and [T2] for OPTPS and OPTKS, respectively, play the fundamental roles.

[T1]

For $1 \leq i \leq m \leq j \leq N$, $x \in B(m,j)$, (1) if $i = m$, then

OPTPS(i,j,m,x) = S(x), and (2) if $i < m$, then

OPTPS(i,j,m,x)

$= \min(i \leq n \leq k \leq m - 1)[\min(y \in B(n,k))$

[OPTPS(i,k,n,y) + PEN(y,x)] + OPTPS(k + 1,j,m,x)].

[T2]

For $1 \leq i \leq m \leq j \leq N$, $x \in B(m,j)$, (1) if $i = m$, then

OPTKS (i,j,m,x) = $\{<x>\}$, and (2) if $i < m$, then

OPTKS(i,j,m,x)

$= \cup ((n,k,y) \in KTS(i,j,m,x))$ $[\{X \oplus Y | X \in OPTKS(i,k,n,y), Y \in OPTKS(k+1,j,m,x)\}]$, where KTS (i,j,m,x) is the set of all the triplets (n,k,y) of n, k, y which attain the minimum in (2) of [T1].

Next, these recurrence equations are proved. To this end, the following [E3] is shown first:

$\cup ((s_0, s_1, s_2, \ldots, s_p) \in D(i, m-1))$  [E3]

$[KB(B(s_0 + 1, s_1), B(s_1 + 1, s_2), \ldots, B(s_{p-1} + 1, s_p), \{x\})] =$ $\cup (i \leq n \leq k \leq m-1) \cup (y \in B(n,k)) \{Y \oplus X |$ $Y \in \cup ((u_0, u_1, u_2, \ldots, u_q) \in D(i, n-1))$ $[KB(B(u_0 + 1, u_1), B(u_1 + 1, u_2), \ldots, B(u_{q-1} + 1, u_q), \{y\})]$, $X \in \cup ((v_0, v_1, v_2, \ldots, v_r) \in D(k+1, m-1))$ $[KB(B(v_0 + 1, v_1), B(v_1 + 1, v_2), \ldots, B(v_{r-1} + 1, v_r), \{x\})]$, (proof)

Let $Z \in \cup ((s_0, s_1, s_2, \ldots, s_p) \in D(i, m-1))$ $[KB(B(s_0+1, s_1), B(s_1+1, s_2), \ldots, B(s_{p-1}+1, s_p), \{x\})]$, then there exist $(\bar{s}_0, \bar{s}_1, \bar{s}_2, \ldots, \bar{s}_p) \in D(i, m-1)$ and $\bar{x}_1 \in B(\bar{s}_0 + 1, \bar{s}_1), \bar{x}_2 \in B(\bar{s}_1 + 1, \bar{s}_2), \ldots, \bar{x}_p \in B(\bar{s}_p)$, such that $Z \in K(\bar{x}_1 \bar{x}_2 \ldots \bar{x}_p x)$.

According to [E2], there exist $\bar{t}$ satisfying $1 \leq \bar{t} \leq \bar{p}$, and $\bar{Y}, \bar{X}$ satisfying $\bar{Y} \in K(\bar{x}_1 \bar{x}_2 \ldots \bar{x}_{\bar{t}}), \bar{X} \in K(\bar{x}_{\bar{t}+1} \bar{x}_{\bar{t}+2} \ldots \bar{x}_{\bar{p}} x)$ such that $Z = \bar{Y} \oplus \bar{X}$.

Let $\bar{n} = \bar{s}_{\bar{t}-1} + 1, \bar{k} = \bar{s}_{\bar{t}}, \bar{y} = \bar{x}_{\bar{t}}$, then $i \leq n \leq k \leq m-1, y \in B(n,k)$, $Y \in \cup ((u_0, u_1, u_2, \ldots, u_q) \in D(i, n-1))$ $[KB(B(u_0 + 1, u_1), B(u_1 + 1, u_2), \ldots, B(u_{q-1} + 1, u_q), \{y\})]$, $X \in \cup ((v_0, v_1, v_2, \ldots, v_r) \in D(k+1, m-1))$ $[KB(B(v_0 + 1, v_1), B(v_1 + 1, v_2), \ldots, B(v_{r-1} + 1, v_r), \{x\})]$.

Hence, $Z \in \cup (i \leq n \leq k \leq m-1) \cup (y \in B(n,k)) \{Y \oplus X |$ $Y \in \cup ((u_0, u_1, u_2, \ldots, u_q) \in D(i, n-1))$ $[KB(B(u_0 + 1, u_1), B(u_1 + 1, u_2), \ldots, B(u_{q-1} + 1, u_q), \{y\})]$, $X \in \cup \{((v_0, v_1, v_2, \ldots, v_r) \in D(k+1, m-1))$ —continued $[KB(B(v_0 + 1, v_1), B(v_1 + 1, v_2), \ldots, B(v_{r-1} + 1, v_r), \{x\})]\}$.

This shows that the left side of the equation to be proved is included in the right side. The fact that the right side is included in the left side can be shown in a manner substantially similar to that described above.

Next, T1 is proved by using E3. (proof of T1)

$OPTPS(i,j,m,x) = \min(Z \in \cup ((s_0, s_1, s_2, \ldots, s_p) \in D(i, m-1))$ $[KB(B(s_0 + 1, s_1), B(s_1 + 1, s_2), \ldots,$ $B(s_{p-1} + 1, s_p), \{x\})]) [P(Z) + S(Z)]$ (by definition)

$= \min(i \leq n \leq k \leq m-1) \min(y \in B(n,k))$ $\min(Y \in \cup ((u_0, u_1, u_2, \ldots, u_q) \in D(i, n-1))$ $[KB(B(u_0 + 1, u_1), B(u_1 + 1, u_2), \ldots,$ $B(u_{q-1} + 1, u_q), \{y\})]$, $X \in \cup ((v_0, v_1, v_2, \ldots, v_r) \in D(k+1, m-1))$ $[KB(B(v_0 + 1, v_1), B(v_1 + 1, v_2), \ldots,$ $B(v_{r-1} + 1, v_r), \{x\})]) [P(Y \oplus X) + S(Y \oplus X)]$ (by E3)

$= \min(i \leq n \leq k \leq m-1) \min(y \in B(n,k))$ $\min(Y \in \cup ((u_0, u_1, u_2, \ldots, u_q) \in D(i, n-1))$ $[KB(B(u_0 + 1, u_1), B(u_1 + 1, u_2), \ldots,$ $B(u_{q-1} + 1, u_q), \{y\})]$, $X \in \cup ((v_0, v_1, v_2, \ldots, v_r) \in D(k+1, m-1))$ $[KB(B(v_0 + 1, v_1), B(v_1 + 1, v_2), \ldots,$ $B(v_{r-1} + 1, v_r), \{x\})])$ $[P(Y) + P(X) + PEN(y,x) + S(Y) + S(X)]$ (by E1)

$= \min(i \leq n \leq k \leq m-1)[\min(y \in B(n,k))$ $[OPTPS(i,k,n,y) + PEN(y,x)] +$ $OPTPS(k + 1,j,m,x)]$.

Thus [T1] is proved. (proof of T2) Since (1) is obvious from its definition, only (2) will be shown.

First, it should be noted that for X satisfying $X \in \cup ((s_0, s_1, s_2, \ldots, s_p) \in D(i, m-1))$ $[KB(B(s_0+1, s_1), B(s_1 + 1, s_2), \ldots, B(s_{p-1}+1, s_p), \{x\})]$, $X \in OPTKS(i,j,m,x)$ is equivalent with $P(X) + S(X) = OPTPS(i,j,m,x)$.

In order to prove (2), it suffices to show (a) $OPTKS(i,j,m,x)$ $\in \cup ((n,k,y) \in KTS(i,j,m,x))$ $[\{Y \oplus X | Y \in OPTKS(i,k,n,y), X \in OPTKS(k+1,j,m,x)\}]$ and (b) $OPTKS(i,j,m,x)$ $\in \cup ((n,k,y)\in KTS(i,j,m,x))$ $[\{Y \oplus X | Y \in OPTKS(i,k,n,y), X \in OPTKS(k+1,j,m,x)\}]$.

Now (a) can be shown as follows:
Let $Z \in \cup((n,k,y) \in KTS(i,j,m,x))$ $[\{Y \oplus X | Y \in OPTKS(i,k,n,y), X \in OPTKS(k+1,j,m,x)\}]$, then there exist $(\bar{n}, \bar{k}, \bar{y}) \in KTS(i,j,m,x)$, $\bar{Y} \in OPTKS(i,\bar{k}, \bar{n}, \bar{y})$, $\bar{X} \in OPTKS(\bar{k}+1,j,m,x)$ such that $Z = \bar{Y} \oplus \bar{X}$.

Obviously, $Z \in \cup ((s_0, s_1, s_2, \ldots, s_p) \in D(i, m-1))$ $[KB(B(s_0+1,s_1), B(s_1+1,s_2), \ldots, B(s_{p-1}+1,s_p), \{x\})]$ and $$\begin{aligned} P(Z) + S(Z) &= P(\bar{Y} \oplus \bar{X}) + S(\bar{Y} \oplus \bar{X}) \\ &= P(\bar{Y}) + P(\bar{X}) + PEN(\bar{y},x) + S(\bar{Y}) + S(\bar{X}) \\ &= P(\bar{Y}) + S(\bar{Y}) + P(\bar{X}) + S(\bar{X}) + PEN(\bar{y},x) \\ &= OPTPS(i,k,n,y) + OPTPS(k+1,j,m,x) + PEN(\bar{y},x) \\ &= OPTPS(i,j,m,x). \end{aligned}$$

Therefore $Z \in OPTKS(i,j,m,x)$.

In order to show (b), let $Z \in OPTKS(i,j,m,x)$.

Since $Z \in \cup ((s_0, s_1, s_2, \ldots, s_p)$ $\in D(i,m-1))[KB(B(s_0+1,s_1),$ $B(s_1+1,s_2), \ldots, B(s_{p-1}+1,s_p), \{x\})]$, according to [E3], there exist $\bar{n}, \bar{k}$ which satisfy $i \leq \bar{n} \leq \bar{k} \leq m-1$, and $\bar{y}, \bar{Y}, \bar{X}$ satisfying $\bar{y} \in B(\bar{n},\bar{k})$, $\bar{Y} \in \cup ((u_0,u_1,u_2, \ldots ,u_q) \in D(i,n-1))$ $[KB(B(u_0+1,u_1), B(u_1+1,u_2), \ldots, B(u_{q-1}+1,u_q), \{\bar{y}\})]$, and $\bar{X} \in \cup ((v_0,v_1,v_2, \ldots ,v_r) \in D(k+1,m-1))$ $[KB(B(v_0+1,v_1), B(v_1+1,v_2), \ldots, B(v_{r-1}+1,v_r), \{x\})]$, such that $Z = \bar{Y} \oplus \bar{X}$ On the other hand, $P(Z) + S(Z) = P(\bar{Y}) + P(\bar{X}) + S(\bar{Y}) + S(\bar{X}) + PEN(\bar{y},x)$, and since Z minimizes the left side of this equation, $\bar{Y}$ and $\bar{X}$ must also minimize the right side of the same equation. Therefore, as is apparent from the proof of [T1]

$(\bar{n}, \bar{k}, \bar{y}) \in KTS(i,j,m,x)$ and $\bar{Y} \in OPTKS(i,\bar{k}, \bar{n}, \bar{y}), \bar{X} \in OPTKS(\bar{k}+1,j,m,x)\}]$ Hence, $Z \in \cup (n,k,y) \in KTS(i,j,m,x))$ $[\{X \oplus Y | X \in OPTKS(i,k,n,y), Y \in OPTKS(k+1,j,m,x)\}]$ Thus, [T2] is proved.

OPTPS(i,j,m,x) has four variables i, j, m and x. Since m represents the starting position of the bunsetsu-phrase x, m is uniquely determined depending on x. Therefore, if we define

[D7]

(1) IN(x) = (the starting position of bunsetsu-phrase x), (2) $\bar{B}(i,j) = \cup (i \leq k \leq j) B(k,j)$, and (3) for $x \in \bar{B}(i,j)$ OPT(i,j,x) = OPTPS(i,j,IN(x),x), then, [T1] may be rewritten as follows:

[T1']

For $1 \leq i \leq j \leq N$ and $x \in \bar{B}(i,j)$, (1) if i = IN(x), then

OPT(i,j,x) = S(x)

and (2) if i < IN(x), then

OPT(i,j,x) = min(i ≤ k ≤ IN(x)−1)

[min(y∈$\bar{B}$(i,k))[OPT(i,k,y)+PEN(y,x)]

+OPT(k+1,j,k)]

As to OPTKS, we define similarly

[D8]

For $1 \leq i \leq j \leq N$ and $x \in \bar{B}(i,j)$, $$OPTK(i,j,x) = OPTKS(i,j,IN(x),x).$$

Furthermore, we denote the set of pairs (k,y) of k and y which attain the minimum value in (2) of [T1'] by KT(i,j,x). Then, [T2] may be rewritten as follows:

[T2']

For $1 \leq i \leq j \leq N$, $x \in \bar{B}(i,j)$ (1) if $i = IN(x)$, then $$OPTK(i,j,x) = \{<x>\}$$

and (2) if $i < IN(x)$, then $$OPTK(i,j,x)$$
$$= \cup ((k,y) \in KT(i,j,x))$$
$$[\{Y \oplus X | Y \in OPTK(i,k,y), X \in OPTK(k+1,j,x))\}].$$

When (k,y) is an element of KT(i,j,x), k is called an optimum segmentation point for i, j and x, while y is called an optimum bunsetsu-phrase corresponding to k.

1.1.2. The Case in Which the Bunsetsu-Phrase Lattice Becomes a Sequence of Bunsetsu-Phrase Sets.

As is apparent from the definitions of OPT(i,j,x) and OPTK(i,j,x), the value of the first variable is significant only if it is equal to the starting position of a bunsetsu-phrase which is not a dummy and is equal to the number obtained by adding 1 to the ending position of a bunsetsu-phrase which is not a dummy, or if it is equal to 1. We can therefore renumber, beginning with 1, the value which can be taken by the first variable, after removing the irrelevant values. In the same way, the value of the second variable is significant only if it is equal to the ending position of bunsetsu-phrase which is not a dummy and is equal to the number obtained by subtracting 1 from the starting position of a bunsetsu-phrase which is not a dummy, or if it is equal to N. We can therefore renumber, beginning with 1, the value which can be taken by the second variable after removing the irrelevant values.

An example in which the above-mentioned renumbering of the phonetic symbol positions is very effective will be described below. Assume that relative to the phonetic symbol positions 1 through N, a segmentation $0 = s_0 < s_1 < \ldots < Sn = N$ exists such that every bunsetsu-phrase in the bunsetsu-phrase lattice starts from $s_{i-1}+1$ and ends at $s_i$ for some i ($1 \leq i \leq n$). That is, in this case, the bunsetsu-phrase lattice consists of a sequence of bunsetsu-phrase sets $B(s_0+1,1,s_1)$, $B(s_1+1,s_2), \ldots, B(s_{n-1}+1,s_n)$. The output from a word processor or a speech recognizer which accepts bunsetsu-phrases separated with spaces or pauses takes this form. It this case, for the value of the first variable of OPT(i,j,x) and OPTK(i,j,x), only $s_0+1$, $s_1+1$, . . . , $s_{n-1}+1$ are significant, and for the value of the second variable, only $s_1, s_2, \ldots, s_n$ are significant. When n is replaced by N and when these significant values are renumbered from 1 to N, the first and second variables of OPT(i,j,x) and OPTK(i,j,x) have the values ranging from 1 to N. Furthermore, these numbers indicate the order of bunsetsu-phrase sets.

Let $$B_i = B(s_{i-1}+1, s_i), (1 \leq i \leq N),$$

then [T1'] and [T2'] may be rewritten as follows as is apparent from the above description:

[T1'']

For $1 \leq i \leq j \leq N$ and $x \in B_j$ (1) if $i = j$, then $$OPT(i,j,x) = S(x),$$

and (2) if $i < j$, then $$OPT(i,j,x)$$
$$= \min (i \leq k \leq j-1)[\min(y \in B_k)[OPT(i,k,y)$$
$$+ PEN(y,x)] + OPT(k+1,j,x)].$$

[T2'']

For $1 \leq i \leq j \leq N$, $x \in B_j$ (1) if $i = j$, then $$OPTK(i,j,k) = \{<x>\},$$

and (2) if $i < j$, then $$OPTK(i,j,k)$$
$$= \cup ((k,y) \in KT(i,j,x))[\{Y \oplus X | Y \in OPTK(i,k,y),$$
$$X \cup OPTK(k+1,j,x)\}],$$

where KT(i,j,x) represents the set of the pairs (k,y) of k and y which attain the minimum value in (2) of [T1''].

1.2. Methods for Determining the Value of OPT and the Pair of Optimum Segmenting Point and Optimum Bunsetsu-Phrase:

1.2.1. The Case of General Bunsetsu-Phrase Lattice

The part (1) of [T1'] shows the fact that when $i=IN(x)$, the value of $OPT(i,j,x)$ is determined to be the value of $S(x)$, while (2) of [T1'] shows the fact that when $i<IN(x)$, if $OPT(i,k,y)$ and $OPT(k+1, j,x)$ ($i \leq k \leq IN(x)-1$, $y \epsilon \bar{B}(i,k)$ have been already calculated, the value of OPT $(i,j,x)$ can be obtained by solving a minimization problem with one variable twice. By these facts, the calculation of $OPT(i,j,x)$ ($1 \leq i \leq N$, $x \epsilon \bar{B}(i,j)$) can proceed from intervals with $i=j$ to larger intervals including the previous intervals. In the process of determining the value of OPT $(i,j,x)$, the pairs of optimum segmenting point and optimum bunsetsu-phrase are also determined. When the value of OPT $(1,N,x)$ is calculated for each $x \epsilon \bar{B}(1,N)$, this phase of calculation is completed.

1.2.2. The Case of a Sequence of Bunsetsu-Phrase Sets

The part (1) of [T1''] shows the fact that when $i=j$, $OPT(i,j,x)$ is determined to be the value of $S(x)$, while (2) of [T1''] shows the fact that when $i<j$, if $OPT(i,k,y)$ and $OPT(k+1,j,x)$ ($i \leq k \leq j-1$, $y \epsilon B_k$) have been already calculated, $OPT(i,j,x)$ can be obtained by solving a minimization problem with one variable twice. By these facts, the calculation of $OPT(i,j,x)(1 \leq i \leq j \leq N$, $x \epsilon B_j)$ can proceed from intervals with $i=j$ to larger intervals including the previous intervals. In the process of determining the value of OPT $(i,j,x)$, the pairs of optimum segmenting point and optimum bunsetsu-phrase are also determined. When the value of OPT $(i,N,x)$ is calculated for each $x \epsilon B_N$, this phase of calculation is completed.

1.3. Methods for Determining the Optimum Dependency Structure and the Degree of Acceptability of This Structure For the sake of simplicity in explanation, the case in which the pair of the optimum segmenting point and the optimum bunsetsu-phrase is uniquely determined will be described. In this case, $OPTK(i,j,x)$ is equal to only one dependency structure.

1.3.1. The Case of General Bunsetsu-Phrase Lattice

Since $$\min(X \epsilon \cup ((s_0,s_1,s_2, \ldots ,s_m) \epsilon D(1,N))$$

$$[KB(B(s_0 + 1,s_1),B(s_1 + 1,s_2), \ldots , B(s_{m-1} + 1,s_m))])[P(X) +$$

$$S(X)] = \min(x \epsilon B(1,N)) [OPT(1,N,x)],$$

by calculating the right side of this equation, the degree of acceptability of the optimum dependency structure on the optimum bunsetsu-phrase sequence can be obtained. Furthermore, let $$x_0 = \text{argmin}(x \epsilon \bar{B}(1,N))[OPT(1,N,x)]$$

then the optimum dependency structure on the optimum bunsetsu-phrase sequence is given by $$OPTK(1,N,x_0).$$

The determination of the structure of OPTK $(1,N,x_0)$ is carried out as follows. If $IN(x_0)=1$, then according to (1) of [T2'], $$OPTK(1,N,x_0) = <x_0>$$

so the optimum dependency structure is determined.

If $IN(x_0) \neq 1$, then according to (2) of [T2']

$$OPTK(1,N,x_0) = OPTK(1,k_1, x_1) \oplus OPTK(k_1 + 1,N,x_0)$$

where $k_1$ is the optimum segmenting point and $x_1$ is the optimum bunsetsu-phrase for 1, N, $x_0$, If $IN(x_1) \neq 1$, by using the optimum segmenting point $k_2$ and the optimum bunsetsu-phrase for $1,k_1,x_1$, $OPTK(1,k_1,x_1)$ can be further decompsed as follows:

$$OPTK(1,k_1,x_1)$$

$$=OPTK(1,k_2,x_2) \oplus OPTK(k_2+1,k_1,x_1)$$

If $IN(x_0) \neq k_1+1$, by using the optimum segmenting point $k_3$ and the optimum bunsetsu-phrase $x_3$ for $k_1+1,N,x_0$, $OPTK(k_1+1,k_2,x_3)$ can be also decomposed as follows:

$$OPTK(k_1 + 1,N,x_0) = (OPTK(k_1 + 1,k_3,x_3) \oplus OPTK(k_3 + 1,N,x_0)$$

Hence, $$OPTK(1,N,x_0) = (OPTK(1,k_2,x_2) \oplus OPTK(k_2 + 1,k_1,x_1)) \oplus$$

$$(OPTK(k_1 + 1,k_3,x_3) \oplus OPTK(k_3 + 1,N,x_0)).$$

Such decomposition operations are carried out until $IN(x)=i$ holds for all $OPTK(i,j,x)$ which appear in the process. The $OPTK(i,j,x)$ in which $IN(x)=i$ holds is replaced by the dependency structure consisting of only one bunsetsu-phrase according to (1) of [T2'], and then the insertion operations are carried out in the reverse order of the decomposition operations. Thus, the optimum bunsetsu-phrase sequence and the optimum dependency structure thereon can be obtained simultaneously.

When there are more than one pairs of the optimum segmenting point and the optimum bunsetsu-phrase, the same operations are carried out for all such pairs, and $OPTK(1,N,x_0)$ consists of all the dependency structures thus obtained.

1.3.2. The Case of a Sequence of Bunsetsu-Phrase Sets.

First, as in the case of the general bunsetsu-phrase lattice, by calculating $$\min(x \epsilon B_N)[OPT(1,N,x)]$$

the degree of acceptability for the optimum dependency structure on the optimum bunsetsu-phrase sequence is calculated. Furthermore, let $$x_0 = \text{argmin}(x \epsilon B_N)[OPT(1,N,x)]$$

then the optimum dependency structure on the optimum bunsetsu-phrase sequence is given by $$OPTK(1,N,x_0)$$

The determination of the structure of $OPTK(1,N,x_0)$ is carried out as follows:
If $N=1$, then according to (1) of [T2''], $$OPTK(1,N,x_0) = <x_0>$$

so the optimum dependency structure is determined.
If $N \neq 1$, then according to (2) of [T2''], $$OPTK(1,N,x_0)$$
$$= OPTK(1,k_1,x_1) \oplus OPTK(k_1+1,N,x_0)$$

where $k_1$ is the optimum segmenting point and $x_1$ is the optimum bunsetsu-phrase for $1, N, x_0$. If $k_1 \neq 1$, by using the optimum segmenting point $k_2$ and the optimum bunsetsu-phrase $x_2$ for $1,k_1,x_1$, $OPTK(1,k_1,x_1)$ can be decomposed as follows:

$$OPTK(1,k_1,x_1)$$
$$= OPTK(1,k_2,k_2) \oplus OPTK(k_2+1,k_1,x_1)$$

In a similar manner, if $N \neq k_1+1$, by using the optimum segmenting point $k_3$ and the optimum bunsetsu-phrase $x_3$ for $k_1+1,N,x_0,OPTK(k_1+1,N,x_0)$ can be decomposed as follows:

$$OPTK(k_1 + 1,N,x_0) =$$
$$OPTK(k_1 + 1,k_3,x_3) \oplus OPTK(k_3 + 1,N,x_0)$$

Hence, $$OPTK(1,N,x_0) = (OPTK(1,k_2,x_2) \oplus OPTK(k_2 + 1,k_1,x_1)) \oplus$$
$$OPTK(k_1 + 1,k_3,x_3) \oplus OPTK(k_3 + 1,N,x_0)).$$

Such decomposition operations are carried out until $i=j$ holds for all $OPTK(i,j,x,)$ which appear in the process. The $OPTK(i,j,x)$ in which $i=j$, by using (1) of [T2''], is replaced by a dependency structure consisting of only one bunsetsu-phrase according to (1) of [T2''], and then insertion operations are carried out in the reverse order of the decomposition operations. Thus, the optimum bunsetsu-phrase sequence and the optimum dependency structure thereon can be obtained simultaneously.

When there are more than one pairs of the optimum segmentation point and the optimum bunsetsu-phrase, the same operations are carried out for all such pairs, and $OPTK(1,N,x_0)$ consists of all the dependency structures thus obtained as in the case of the general bunsetsu-phrase lattice.

The above and other objects, effects, features and advantages of the present invention will become more apparent from the following description of preferred embodiments thereof taken in conjunction with the accompanying drawings.

DETAILED DESCRIPTION OF PREFERRED EMBODIMENTS

Figure 1:
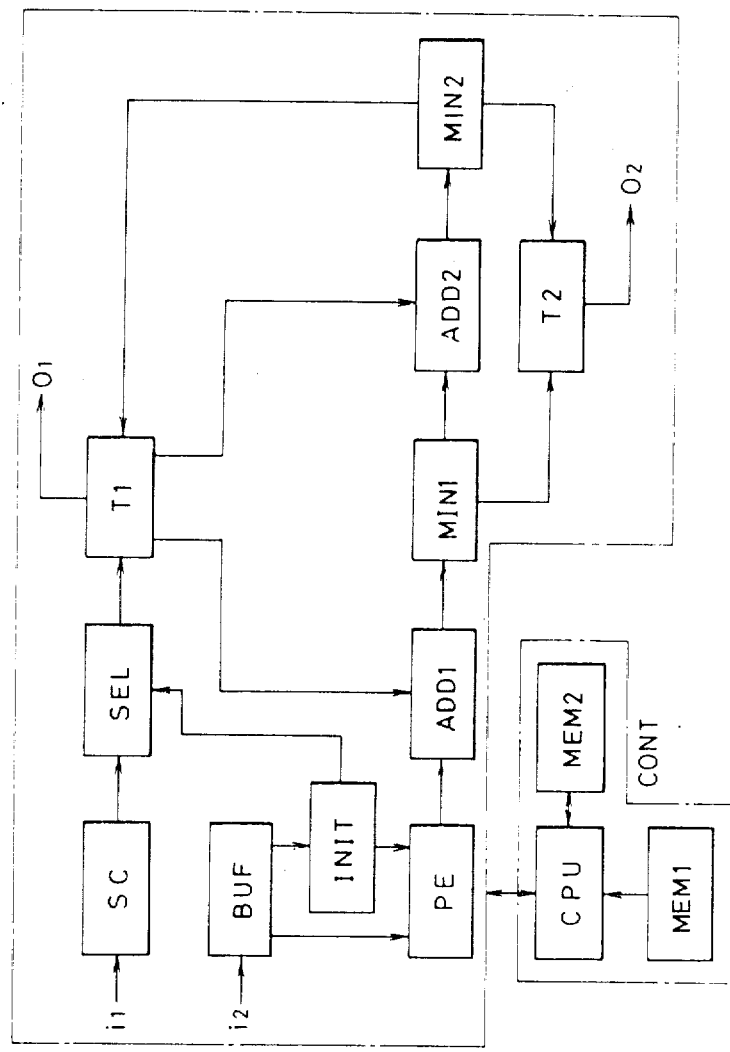
FIG. 1 is a block diagram showing the first embodiment of an apparatus for carrying out the present invention.

Apparatus and Sequences to Carry out the Invention 2.1 The Case of General Bunsetsu-Phrase Lattice The first embodiment of an apparatus to carry out the present invention based on item 1.2.1. is shown in FIG. 1.

In the following description, the phonetic symbol positions are represented by $1, 2, \ldots, N$; the number of elements of the bunsetsu-phrase set $\overline{B}(i,j)$ is represented by $NUM(i,j)$; and the elements of $\overline{B}(i,j)$ are represented by $x_{i,j,1}, x_{i,j,2}, \ldots, x_{i,j},NUM(i,j)$.

In FIG. 1, SC designates a buffer memory such as a RAM for storing the value $S(x_{i,j,q})$, i.e. the degree of reliability of each bunsetsu-phrase, transferred through an input terminal $i_1$; and BUF, a buffer memory such as a RAM for holding therein bunsetsu-phrase sets transferred through a bunsetsu-phrase input terminal $i_2$. When the present invention is applied to speech recognition, for instance, each bunsetsu-phrase of the bunsetsu-phrase lattice coming out from the speech recognizer is applied to the bunsetsu-phrase input terminal $i_2$, while the degree of realibility of each bunsetsu-phrase coming out from the speech recognizer is applied to the input terminal $i_1$. When the present invention is applied to Japanese word processing of the type in which a non-segmented Kana sentence is converted into a sentence consisting of Kana and Kanji, a morphological analysis of a given Kana string $a_1, a_2, \ldots, a_N$ is carried out by any suitable prior art method and bunsetsu-phrase candidates for each $i,j(1 \leq i \leq j \leq N)$ each having a substring $a_i, a_{i+1}, \ldots, a_j$ of the original Kana string are all enumerated and applied to the input terminal $i_2$. In this case, the degree of reliability of each bunsetsu-phrase which is determined by such information as the frequency of use of a word is applied to the input terminal $i_1$.

PE is a unit for calculating the degree of dependency between two bunsetsu-phrases x and y read out from BUF.

Figure 2A:
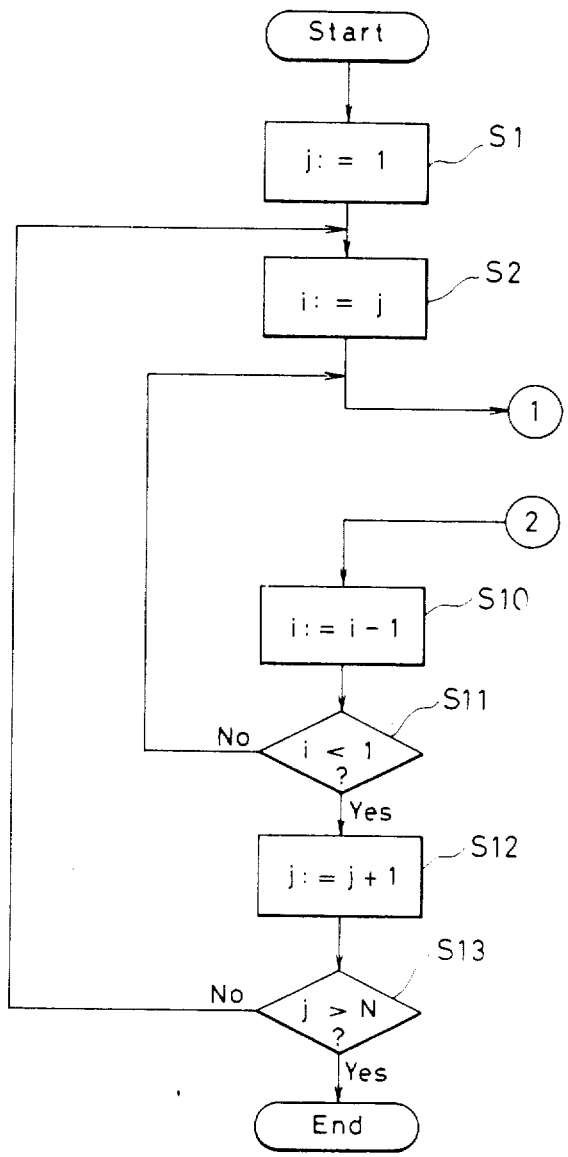
FIGS. 2A and 2B show a flowchart representing an example of the control sequence in the first embodiment.
Figure 2B:
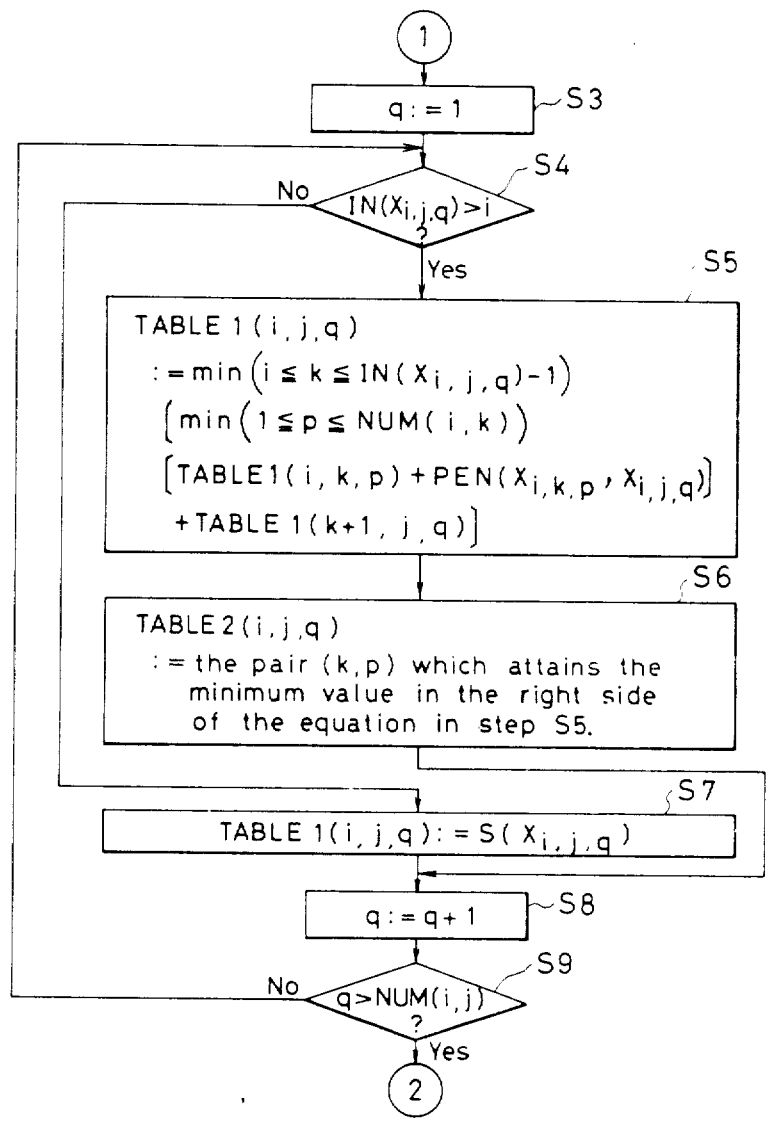

T1 and T2 are RAMS for realizing tables TABLE1 and TABLE2 in the flowchart as shown in FIGS. 2A and 2B, respectively.

INIT is a detector unit for detecting whether the starting position of bunsetsu-phrase $x_{i,j,q}$ is equal to i or not; that is, whether or not $IN(x_{i,j,q}) = i$.

SEL is a data selected unit for selecting $S(x_{i,j,q})$ from SC in response to the reception of a signal from INIT representing that the starting position of a bunsetsu-phrase $x_{i,j,q}$ is equal to i, and writing the value into TABLE1(i,j,q) realized as T1.

ADD1 is an adder for adding a value stored in the TABLE1(i,k,p) to the value of $PEN(x_{i,k,p}, x_{i,j,q})$.

MIN1 is a minimum value detector for detecting a minimum value of the output from the adder ADD1 when said p is varied, and for detecting p which gives said minimum value.

ADD2 is an adder for adding the output from the minimum value detector MIN1 to the value in TABLE1(k+1,j,q).

MIN2 is a minimum value detector for detecting a minimum value of the output from the adder ADD2 when said k is varied, and for detecing k which gives said minimum value.

CONT designates a control unit for controlling the whole apparatus to work in the predetermined operation sequence, and, for instance, comprises a central processing unit CPU, a memory MEM1 in the form of a ROM for storing therein the control sequence and a working memory MEM2 in the form of a RAM. The results of the calculation written into RAMs T1 and T2 are read out from output terminals $O_1$ and $O_2$, respectively.

FIGS. 2A and 2B show a flowchart illustrating an example of control sequence stored in MEM1 beforehand in the first embodiment shown in FIG. 1 for obtaining the pair of the optimum segmenting point and the optimum bunsetsu-phrase used to decide the optimum dependency structure on the optimum bunsetsu-phrase sequence and its degree of acceptability. First this flowchart will be described.

Figure 3A:
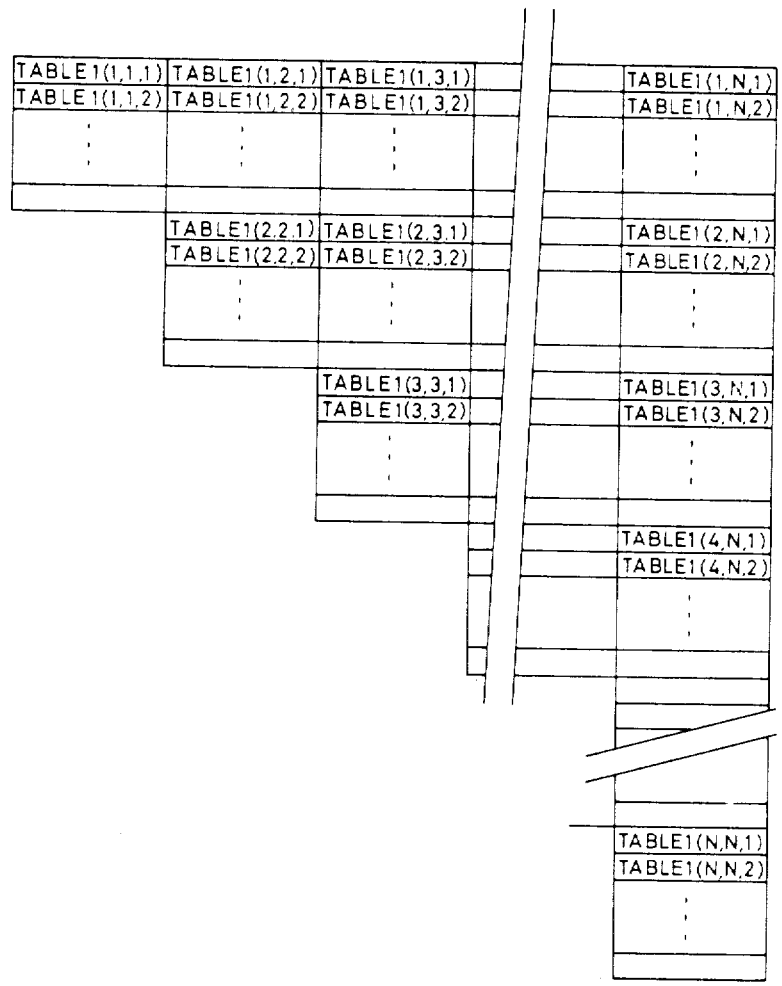
FIGS. 3A and 3B show an example of the construction of tables required for carrying out the control sequence defined in the flowchart shown in FIGS. 2A and 2B or 5A and 5B.
Figure 3B:
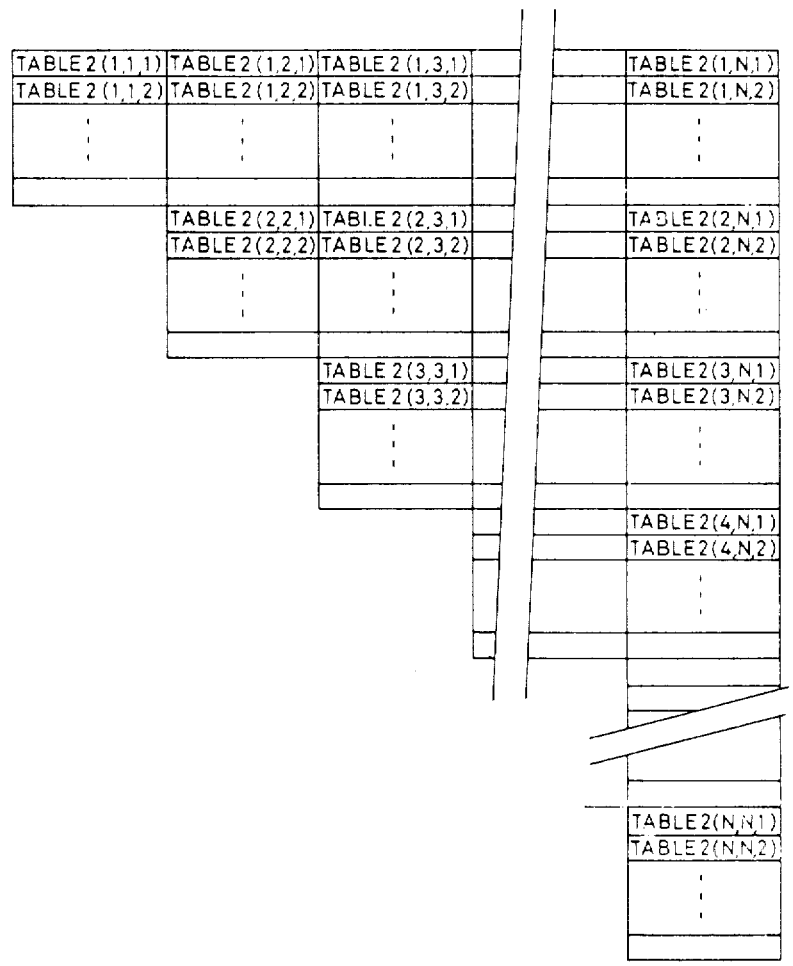

In addition to the flowchart as shown in FIGS. 2A and 2B, two three-dimensional tables TABLE1(i,j,q) and TABLE2(i,j,q) having, as shown in FIGS. 3A and 3B, the same number of columns and rows as the total number N of the phonetic symbol positions under consideration and the same number of sections as the number NUM(i,j) of elements of bunsetsu-phrase sets $\overline{B}(i,j)$ ($1 \leq i \leq j \leq N, 1 \leq q \leq NUM(i,j)$) are required. The suffixes of each table represents the positions of corresponding row, column and section from the left to right, respectively. TABLE1(i,j,q) is used to store the values of $OPT(i,j,x_{i,j,q})$ while TABLE2(i,j,q) is used to store the pairs of the optimum segmenting point and the optimum bunsetsu-phrase number for $i,j,x_{i,j,q}$.

Operations in the flowchart proceed as follows:

① In steps S1–S13 of the flowchart as shown in FIGS. 2A and 2B, the column number j of each table is incremented from 1 to N and the operation ② to be described below is carried out for each column.

② In steps S2–S11, the row number i is decremented from j to 1 and then the following operation ③ is executed.

③ In steps S3 to S9, q is incremented from 1 to NUM(i,j) and the following operations (1) and (2) are executed.

(1) If $IN(x_{i,j,q}) = 1$ in step S4, then the following operation [F1] is executed in step S7:

[F1] The value of $S(x_{i,j,q})$ is stored in TABLE1(i,j,q).

(2) If $IN(x_{i,j,q}) > i$ in step S4, [F2] and [F3] below are executed in step S5 and step S6, respectively. [F2]

$$\min(i \leq k \leq IN(x_{i,j,q}) - 1)[\min(1 \leq p \leq NUM(i,k))$$

$$[TABLE1(i,k,p) + PEN(x_{i,k,p}, x_{i,j,q})] + TABLE1(k+1,j,q)]$$

is calculated and the value is stored in TABLE1(i,j,q).

[F3] The pair (k,p) of k and p which attain the minimum value in [F2] is stored in TABLE2(i,j,q).

According to the above-mentioned procedure, each row, each column and each section in TABLE1 and TABLE2 are filled with the calculated values sequentially.

When $j > N$ in step S13, the calculation is completed, and the values of $OPT(1,N,x_{1,N,q})$ ($1 \leq p \leq NUM(1,N)$) are stored in TABLE1(1,N,q). Since the information concerning the optimum segmenting points and optimum bunsetsu-phrase numbers is stored in TABLE2, the optimum bunsetsu-phrase sequence and the optimum dependency structure thereon can be composed using the above information in the manner described in item 1.3.1.

2.2. The Case of a Sequence of Bunsetsu-Phrase Sets

Figure 4:
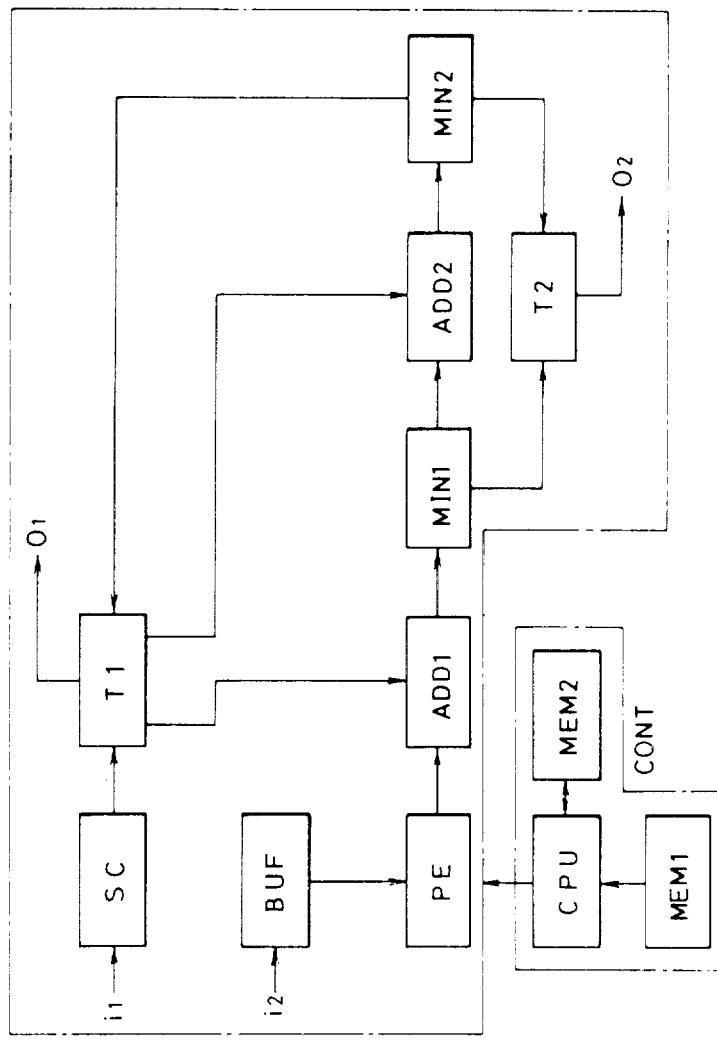
FIG. 4 is a block diagram showing the second embodiment of an apparatus for carrying out the presence invention.

The second embodiment of an apparatus to carry out the present invention is shown FIG. 4.

Since a sequence of bunsetsu-phrase sets is a special form of a bunsetsu-phrase lattice, it is apparent that the above-described method for the general bunsetsu-phrase lattice is also applicable to the present case. However, the following method according to item 1.2.2 is more efficient.

In the following description, the positions of bunsetsu-phrase sets are represented by 1, 2, . . . , N, the number of elements of the bunsetsu-phrase set $B_j$, by NUM(j); and the elements of $B_j$, by $x_{j,1}$, $x_{j,2}$, . . . , $x_{j,NUM(j)}$.

In FIG. 4, SC designates a buffer memory such as a RAM for storing the value of the degree of reliability for each bunsetsu-phrase transferred through an input terminal $i_1$; and BUF, a buffer memory such as a RAM for storing bunsetsu-phrase sets transferred through a bunsetsu-phrase input terminal $i_2$. When the present invention is applied to speech recognition, for instance, each bunsetsu-phrase candidate derived from a speech recognizer is transferred through the input terminal $i_2$, while the degree of reliability of the corresponding bunsetsu-phrase is transferred through the terminal $i_1$, PE is a unit for calculating the degree of dependency PEN(x,y) between two bunsetsu-phrases x and y read out from BUF.

Figure 5A:
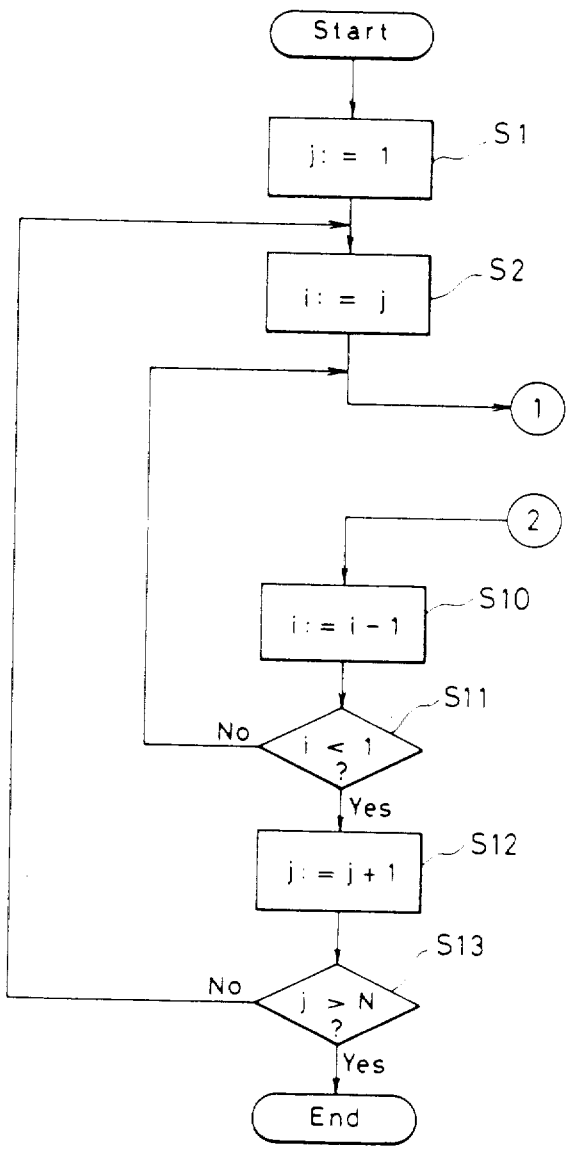
FIGS. 5A and 5B show a flowchart showing an example of the control sequence in the second embodiment.
Figure 5B:
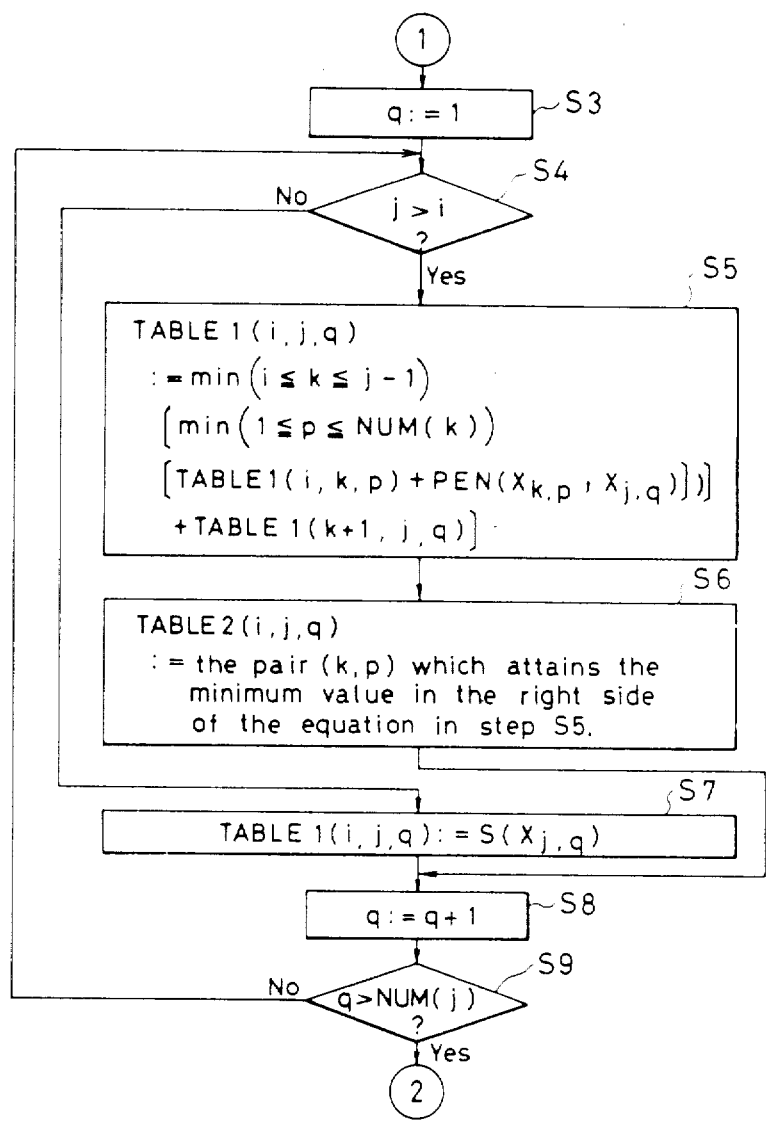

T1 and T2 are RAMs for realizing tables TABLE1 and TABLE2 in the flowchart shown in FIGS. 5A and 5B.

ADD1 is an adder for adding a value stored in TABEL1(i,k,p) to the value of PEN $(x_{k,p}, x_{j,q})$.

MIN1 is a minimum value detector for detecting a minimum value of the output from ADD1 when said p is varied, and for detecting p which attains the minimum value.

ADD2 is another adder for adding the output from the minimum value detector MIN1 to the value in TABLE1(k+1,j,q).

MIN2 is a minimum value detector for detecting the minimum value of the output from the adder ADD2 when said k is varied, and for detecting k which attains the minimum value.

CONT is a control unit for controlling the whole apparatus to work in the predetermined operation sequence and, for instance, comprises a central processing unit CPU, a memory MEM1 in the form of a ROM for storing the control sequence and a working memory MEM2 in the form of a RAM. The results of calculation written into RAM T1 and T2 are read out from output terminals $O_1$ and $O_2$, respectively.

FIGS. 5A and 5B show a flowchart illustrating an example of the control sequence stored in the MEM1 for obtaining the pair of the optimum segmenting point and the optimum bunsetsu-phrase used to decide the optimum dependency structure on the optimum bunsetsu-phrase sequence, and its degree of acceptability. This flowchart will be described below.

In addition to the flowchart as shown in FIG. 5, two three-dimentional tables TABLE1(i,j,q) and TABLE2(i,j,q) ($1 \leq i \leq j \leq N, 1 \leq q \leq NUM(j)$) having the same number of columns and rows as the length N of the sequence of bunsetsu-phrase sets under consideration and the same number of sections as the number of elements NUM(j) of the j-th bunsetsu-phrase set. The suffixes of each table represent the position of corresponding column, row and section from left to right, respectively. TABLE1(i,j,q) stores the values of OPT(i,j,$x_{j,q}$) while TABLE2(i,j,q) stores the pairs of the optimum segmenting point and the optimum bunsetsu-phrase number for i,j,$x_{j,q}$.

Operations in the flowchart proceed as follows:

① In steps S1-S13 of the flowchart as shown in FIGS. 5A and 5B, the column number j of each table is incremented from 1 to N and the operation ② to be described below is carried out for each column.

② In steps S2-S11, the row number i is decremented from j to 1 and ③ below is executed.

③ In steps S3-S9, q is incremented from 1 to NUM(j) and (1) and (2) to be described below are executed.

(1) If j=i in step S4, then the following operation is executed in step S7:

[F1'] The value of S($x_{j,q}$) is stored in TABLE1(i,j,q).

(2) if j>i in step S4, [F2'] to be described below is executed in step S5 and [F3'] to be described below is executed in step S6.

[F2'

$$\min(i \leq k \leq j-1)[\min(1 \leq p \leq NUM(k))$$

$$[TABLE1(i,k,p)+PEN(x_{k,p},x_{j,q})]+TABLE1(k+1,j,q)]$$

is calculated and the value is stored in TABLE1(i,j,q). [F3']. The pair (k,p) of k and p which attain the minimum value in [F2'] is stored in TABLE2(i,j,q).

Each column, each row and each section of TABLE1 and TABLE2 are filled with the calculated value sequentially as described above.

When j>N in step S13, the calculation is completed and the values of OPT(1,N,$x_{N,q}$) ($1 \leq q \leq NUM(N)$) are stored in TABLE1(1,N,q). Since the information concerning the optimum segmenting points and the optimum bunsetsu-phrase numbers is stored in TABLE2, the optimum bunsetsu-phrase sequence and optimum dependency structure thereon can be composed according to the method described in the above item 1.3.2.

2.3. Composition of the Optimum Dependency Structure

In order to actually carry out the present invention, in addition to the flowchart as shown in FIGS. 2A and 2B or in FIGS. 5A and 5B, a mechanism for composing the optimum bunsetsu-phrase sequence and the optimum dependency structure thereon is needed, but the gist of the present invention is to calculate the contents in TABLE1 and TABLE2 so that the description of the mechanism for composing the optimum bunsetsu-phrase sequence and the optimum dependency structure thereon is limited to the scope of item 1.3.1 or 1.3.2. It should be noted, however, that when the calculation of the contents in TABLE1 and TABLE2 is accomplished, the greater part of the computation required for obtaining the optimum bunsetsu-phrase sequence and the optimum dependency structure thereon is completed.

2.4. Remarks on Non-uniqueness of the Pair of Optimum Segmenting Point and Optimum Bunsetsu-Phrase Sometimes, there exist more than one pairs of k and p which attain the minimum value in [F2] or [F2']. In this case, TABLE2(i,j,q) is so designed and constructed as to store more than one pairs of numerical values, and all such pairs are to be stored in TABLE2(i,j,q) in [F3] or [F3']. Even if the flowchart as shown in FIG. 2 or 5 is so modified as to implement this, the amount of computation remains almost unchanged.

2.5. Features of the Invention

As described above, in selecting the optimum bunsetsu-phrase sequence from the given bunsetsu-phrase sets B(i,j) ($1 \leq i \leq j \leq N$) corresponding to phonetic symbol position i and j satisfying the condition that the starting position of the first bunsetsu-phrase equals 1, the ending position of the last bunsetsu-phrase equals N and the ending position of a bunsetsu-phrase except the last bunsetsu-phrase added with 1 equals the starting position of the succeeding bunsetsu-phrase, and in obtaining the optimum dependency structure thereon and the degree of acceptability thereof, the feature of the present invention resides in that:

the acceptability of the optimum dependency structure and the information required for composing the optimum dependency structure are calculated and stored progressively from shorter intervals to longer intervals with the last bunsetsu-phrase fixed; and in calculating the acceptability of the optimum dependency structure and in obtaining the information required for composing the optimum dependency structure with the last bunsetsu-phrase fixed as $x_{i,j,q}$ for the interval [i, j] ($1 \leq i, j \leq N$), the same kind of information already calculated and stored for the interval [i, k], the same kind of information already calculated and stored for the interval [k+1, j] and the degree of dependency between the bunsetsu-phrases $x_{i,k,p} \in \bar{B}(i,k)$ and $x_{i,j,q}$ for every possible k and p are the only information referred.

The above embodiments have been described in conjunction with the process for obtaining a minimum value because it is assumed that a smaller value of S implies a higher degree of reliability and a smaller value of PEN implies a higher a degree of dependency between two bunsetsu-phrases. However, when a greater value of S implies a higher degree of reliability and a greater value of PEN implies a higher degree of dependency, the process for obtaining a maximum value should be carried out instead of obtaining a minimum value.

3. Advantageous Effects of the Invention

The fundamental operations to be performed in the present invention are a comparison operation and addition operation so that the number of operations carried out by the method in accordance with the present invention is compared with that of the enumeration method which is the prior art method. In order to evaluate the number of operations, the followings are assumed:

(1) In order to calculate PEN(x,y), J addition operations are required;

(2) In order to add m numerical values, m−1 addition operations are required;

(3) In order to find a minimum value in m numerical values, m−1 comparison operations are required; and (4) the number of elements in bunsetsu-phrase set (in the case of a sequence of bunsetsu-phrase set, $B_k$; and in the case of bunsetsu-phrase lattice, B(i,j)) are the same for all k, or for all i and j.

Then, the number of operations is determined by the following three parameters:

M: In the case of a bunsetsu-phrase lattice, the number of elements in B(i,j), and in the case of a sequence of bunsetsu-phrase sets, the number of elements in $B_k$.

N: In the case of a bunsetsu-phrase lattice, the total length of the phonetic symbol string while in the case of a sequence of bunsetsu-phrase sets, the total length of the sequence. The number of operations required for calculating PEN(x,y) expressed in terms of the number of addition operations.

Under the above-mentioned assumption, the number of operations is calculated as follows:

THE CASE OF GENERAL BUNSETSU-PHRASE LATTICE 3.1.1. The Present Invention (1) The number of addition operations $$= M^2(J+1)(N-1)N(N+1)(N+3)/120$$

$$+ M(N-1)N(N+1)(N+2)/24$$

(2) The number of comparison operations $$= M^2(N-1)N(N+1)(N+2)(N+3)/120$$

$$- M(N-1)N(N+1)(N+2)/24$$

3.1.2. The Enumeration Method (The Prior Art Method)

(1) The number of addition operations $$= \Sigma(0 \leq n \leq N-1)$$

$$[_{N-1}C_n \cdot \{knum(n+1)\cdot(J+1)\cdot n + n\} \cdot M^{n+1}]$$

(2) The number of comparison operations $$= \Sigma(0 \leq n \leq N-1)[_{N-1}C_n \cdot knum(n+1) \cdot M^{n+1}) - 1$$

where knum(n) represents the number of dependency structures on a sequence of bunsetsu-phrase which has a length n and is defined in Summary of Invention.

The results of the calculations for these numbers of addition operations and comparison operations when J=1, M=5,10 and N=5,10,15 and 20 are shown in TABLE 2.

TABLE 2

| | | \multicolumn{4}{c}{The numbers of operations in the case of the bunsetsu-phrase lattice} |
|---|---|---|---|---|---|
| | | \multicolumn{4}{c}{M} |
| | | 5 | | 10 | |
| | N | addition | comparison | addition | comparison |
| The present invention | 5 | $3.0 \times 10^3$ | $1.3 \times 10^3$ | $1.2 \times 10^4$ | $5.4 \times 10^3$ |
| | 10 | $6.7 \times 10^4$ | $3.1 \times 10^4$ | $2.6 \times 10^5$ | $1.3 \times 10^5$ |
| | 15 | $4.4 \times 10^5$ | $2.1 \times 10^5$ | $1.7 \times 10^6$ | $8.5 \times 10^5$ |
| | 20 | $1.7 \times 10^6$ | $8.3 \times 10^5$ | $6.8 \times 10^6$ | $3.4 \times 10^6$ |
| The enumeration method | 5 | $4.5 \times 10^5$ | $5.8 \times 10^4$ | $1.3 \times 10^7$ | $1.6 \times 10^6$ |
| | 10 | $1.4 \times 10^{12}$ | $8.0 \times 10^{10}$ | $1.1 \times 10^{15}$ | $6.3 \times 10^{13}$ |
| | 15 | $4.6 \times 10^{18}$ | $1.7 \times 10^{17}$ | $1.1 \times 10^{23}$ | $3.9 \times 10^{21}$ |
| | 20 | $1.7 \times 10^{25}$ | $4.6 \times 10^{23}$ | $1.1 \times 10^{31}$ | $2.9 \times 10^{29}$ |

THE CASE OF A SEQUENCE OF BUNSETSU-PHRASE SETS 3.2.1. The Present Invention (1) The number of addition operations $$= ((J+1)M+1)MN(N-1)(N+1)/6$$

(2) The number of comparison operations $$= M^2N(N-1)(N+1)/6 - MN(N-1)/2$$

3.2.2. The Enumeration Method (The Prior Art Method)

(1) The number of addition operations $$= (knum(N)\cdot(J+1)\cdot(N-1) + (N-1))\cdot M^N$$

(2) The number of comparison operations $$= knum(N) \cdot M^N - 1$$

TABLE 3

The numbers of operations in the case of a sequence of bunsetsu-phrase sets

| | | M=5 | | M=10 | |
|---|---|---|---|---|---|
| | N | addition | comparison | addition | comparison |
| The present invention | 5 | $1.1 \times 10^3$ | $4.5 \times 10^2$ | $4.2 \times 10^3$ | $1.9 \times 10^3$ |
| | 10 | $9.1 \times 10^3$ | $3.9 \times 10^3$ | $3.5 \times 10^4$ | $1.6 \times 10^4$ |
| | 15 | $3.1 \times 10^4$ | $1.3 \times 10^4$ | $1.2 \times 10^5$ | $5.5 \times 10^4$ |
| | 20 | $7.3 \times 10^4$ | $3.2 \times 10^4$ | $2.8 \times 10^5$ | $1.3 \times 10^5$ |
| The enumeration method | 5 | $3.6 \times 10^5$ | $4.4 \times 10^4$ | $1.2 \times 10^7$ | $1.4 \times 10^6$ |
| | 10 | $8.5 \times 10^{11}$ | $4.7 \times 10^{10}$ | $8.8 \times 10^{14}$ | $4.9 \times 10^{13}$ |
| | 15 | $2.3 \times 10^{18}$ | $8.2 \times 10^{16}$ | $7.5 \times 10^{22}$ | $2.7 \times 10^{21}$ |
| | 20 | $6.4 \times 10^{24}$ | $1.7 \times 10^{23}$ | $6.7 \times 10^{30}$ | $1.8 \times 10^{29}$ |

The results of calculations for these numbers of addition operations and comparison operations when $J=1$, $M=5$ and 10, $N=5,10,15$ and 20 are shown in TABLE 3.

As is apparent from TABLE 2 and TABLE 3, the efficiency of the present invention becomes higher as the values of M and N become larger. For instance, in the case of $J=1$, $M=10$ an $N=20$, the present invention brings the number of operations down to about one $10^{24}$-th to $10^{25}$-th of the enumeration method.

What is claimed is:

1. In a language processing method wherein when phonetic symbol positions are represented by natural numbers from 1 to N, a set of bunsetsu-phrases in each element of which the starting position of the phonetic expression and the ending position thereof are defined at various positions within a range from 1 to N and numerical values each indicating a degree of reliability of each bunsetsu-phrase are given, optimum bunsetsu-phrase sequences are selected, the optimum dependency structure thereon and a degree of acceptability thereof are calculated from all the possible bunsetsu-phrase sequences obtained by arranging the bunsetsu-phrases so as to satisfy the conditions that the starting position of the phonetic expression of the first bunsetsu-phrase is equal to 1 while the ending position of the phonetic expression of the last bunsetsu-phrase is equal to N and that the value obtained by adding 1 to the ending position of the phonetic expression of a bunsetsu-phrase except the last bunsetsu-phrase equals the starting position of the phonetic expression of the succeeding bunsetsu-phrase under the criterion of optimality that the sum of the numerical values representative of the degree of dependency between two bunsetsu-phrases and numerical value representative of the degree of reliability of each bunsetsu-phrase has a minimum or maximum value, said language processing method comprising the steps of:

preparing a first and a second two-dimensional triangular matrix table each having columns and rows each equal to N;

dividing each square of said first and second tables into sections equal in number to bunsetsu-phrases in each of which the ending position of the phonetic expression is equal to the number of the row and the starting position thereof is not less than the number of the column thereby three-dimensionalizing said first and second tables;

when the q-th bunsetsu-phrase in a set of bunsetsu-phrase in which the starting position of the phonetic expression is not less than a natural number i while the ending position thereof is equal to a natural number j, has the starting position of the phonetic expression equal to i, storing the degree of reliability of said q-th bunsetsu-phrase into the address designated by the i-th row, the j-th column and the q-th section of said first table;

with respect to natural numbers k ranging from i to the number obtained by subtracting 1 from the starting position of phonetic expression of the q-th bunsetsu-phrase in the set of bunsetsu-phrases each element in which has a starting position not less than i and an ending position equal to j, storing calculated values to the address of said first table designated by the i-th row, the k-th column and each section and to the address of said first table designated by the (k+1)-th row, the j-th column and the q-th section;

after said storage, calculating the sum of the value stored in the address of the said first table designated by the i-th row, the k-th column and the p-th section, the value stored in the address of the said first table designated by the (k+1)-th row, the j-th column and the q-th section and the degree of dependency between the p-th bunsetsu-phrase in the set of bunsetsu-phrases each element in which has the starting position not less than i and ending position equal to k and the q-th bunsetsu-phrase in the set of bunsetsu-phrases each element in which has the starting position not less than i and the ending position equal to j;

storing the minimum or maximum value of said sum with respect to said k and said p to the address of said first table designated by the i-th row, the j-th column and the q-th section;

storing the pair of said optimum segmenting point k and said optimum bunsetsu-phrase number p attaining said minimum or maximum value to the address of said second table designated by the i-th row, the j-th column and the q-th section;

filling said first and second table sequentially with the calculated values;

searching for the minimum or maximum value among the values stored in the sections of the address designated by the first row and the N-th column of said first table, thereby obtaining the acceptability of the optimum dependency structure on the optimum bunsetsu-phrase sequence and the number of the last bunsetsu-phrase in said optimum bunsetsu-phrase sequence; and obtaining all pairs of the optimum segmenting point and the optimum bunsetsu-phrase number required for composing the optimum dependency structure on the optimum bunsetsu-phrase sequence in said second table.

2. A language processing apparatus wherein when phonetic symbol positions are represented by natural numbers from 1 to N, a set of bunsetsu-phrases in each element of which the starting position of the phonetic expression and the ending position thereof are defined at various positions within a range from 1 to N and numerical values each indicating a degree of reliability of each bunsetsu-phrase are given, optimum bunsetsu-phrase sequences are selected, the optimum dependency structure thereon and a degree of acceptability thereof are calculated from all the possible bunsetsu-phrase sequences obtained by arranging the bunsetsu-phrases so as to satisfy the conditions that the starting position of the phonetic expression of the first bunsetsu-phrase is equal to 1 while the ending position of the phonetic expression of the last bunsetsu-phrase is equal to N and that the value obtained by adding 1 to the ending position of the phonetic expression of a bunsetsu-phrase except the last bunsetsu-phrase equals the starting position of the phonetic expression of the succeeding bunsetsu-phrase under the criterion of optimality that the sum of the numerical values representative of the degree of dependency between two bunsetsu-phrases and numerical value representative of the degree of reliability of each bunsetsu-phrase has a minimum or maximum value, said language processing apparatus comprising:

means for storing a first and a second two-dimensional triangular matrix table each having columns and rows each equal to N, each square of said first and second tables being divided into sections equal in number to bunsetsu-phrases in each of which the ending position of the phonetic expression is equal to the number of the row and the starting position thereof is not less than the number of the column thereby three-dimensionalizing said first and second tables;

means for, when the q-th bunsetsu-phrase in a set of bunsetsu-phrase in which the starting position of the phonetic expression is not less than a natural number i while the ending position thereof is equal to a natural number j, has the starting position of the phonetic expression equal to i, storing the degree of reliability of said q-th bunsetsu-phrase into the address designated by the i-th row, the j-th column and the q-th section of said first table;

means for, with respect to natural numbers k ranging from i to the number obtained by subtracting 1 from the starting position of phonetic expression of the q-th bunsetsu-phrase in the set of bunsetsu-phrases each element in which has a starting position not less than i and an ending position equal to j, storing calculated values to the address of said first table designated by the i-th row, the k-th column and each section and to the address of said first table designated by the (k+1)-th row, the j-th column and the q-th section;

means for, after said storage, calculating the sum of the value stored in the address of the said first table designated by the i-th row, the k-th column and the p-th section, the value stored in the address of the said first table designated by the (k+1)-th row, the j-th column and the q-th section and the degree of dependency between the p-th bunsetsu-phrase in the set of bunsetsu-phrases each element in which has the starting position not less than i and ending position equal to k and the q-th bunsetsu-phrase in the set of bunsetsu-phrases each element in which has the starting position not less than i and the ending position equal to j;

means for storing the minimum or maximum value of said sum with respect to said k and said p to the address of said first table designated by the i-th row, the j-th column and the q-th section;

means for storing the pair of said optimum segmenting point k and said optimum bunsetsu-phrase number p attaining said minimum or maximum value to the address of said second table designated by the i-th row, the j-th column and the q-th section;

means for filling said first and second table sequentially with the calculated values;

means for searching for the minimum or maximum value among the values stored in the sections of the address designated by the first row and the N-th column of said first table, thereby obtaining the acceptability of the optimum dependency structure on the optimum bunsetsu-phrase sequence and the number of the last bunsetsu-phrase in said optimum bunsetsu-phrase sequence; and means for obtaining all pairs of the optimum segmenting point and the optimum bunsetsu-phrase number required for composing the optimum dependency structure on the optimum bunsetsu-phrase sequence in said second table.

* * * * *